March 4, 1941.  C. S. BRAGG  2,234,019
THROTTLE AND TRANSMISSION OPERATING POWER MEANS FOR MARINE CRAFT
Filed March 25, 1938  12 Sheets-Sheet 1

INVENTOR
CALEB S. BRAGG
BY
H. O. Clayton
ATTORNEY

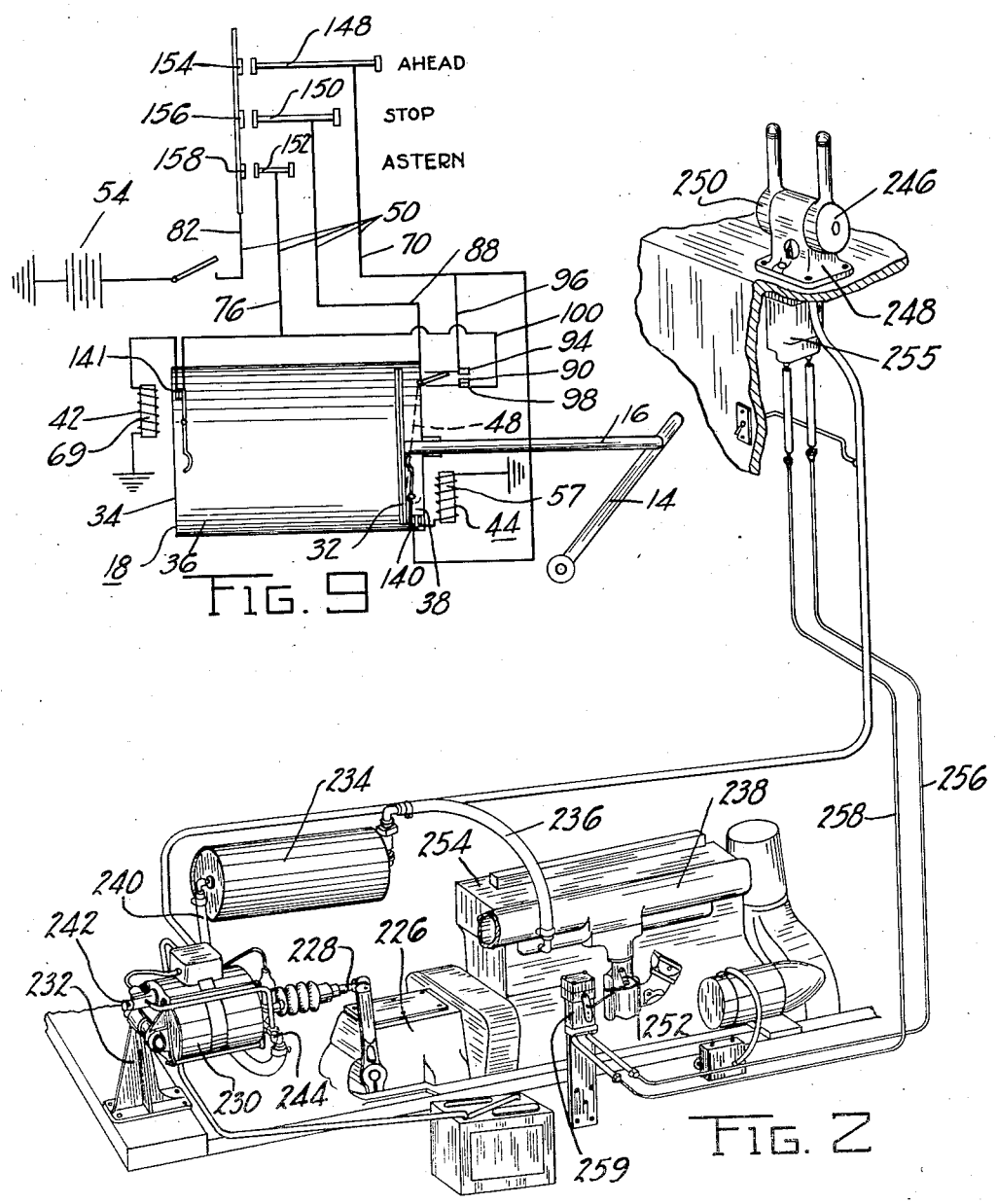

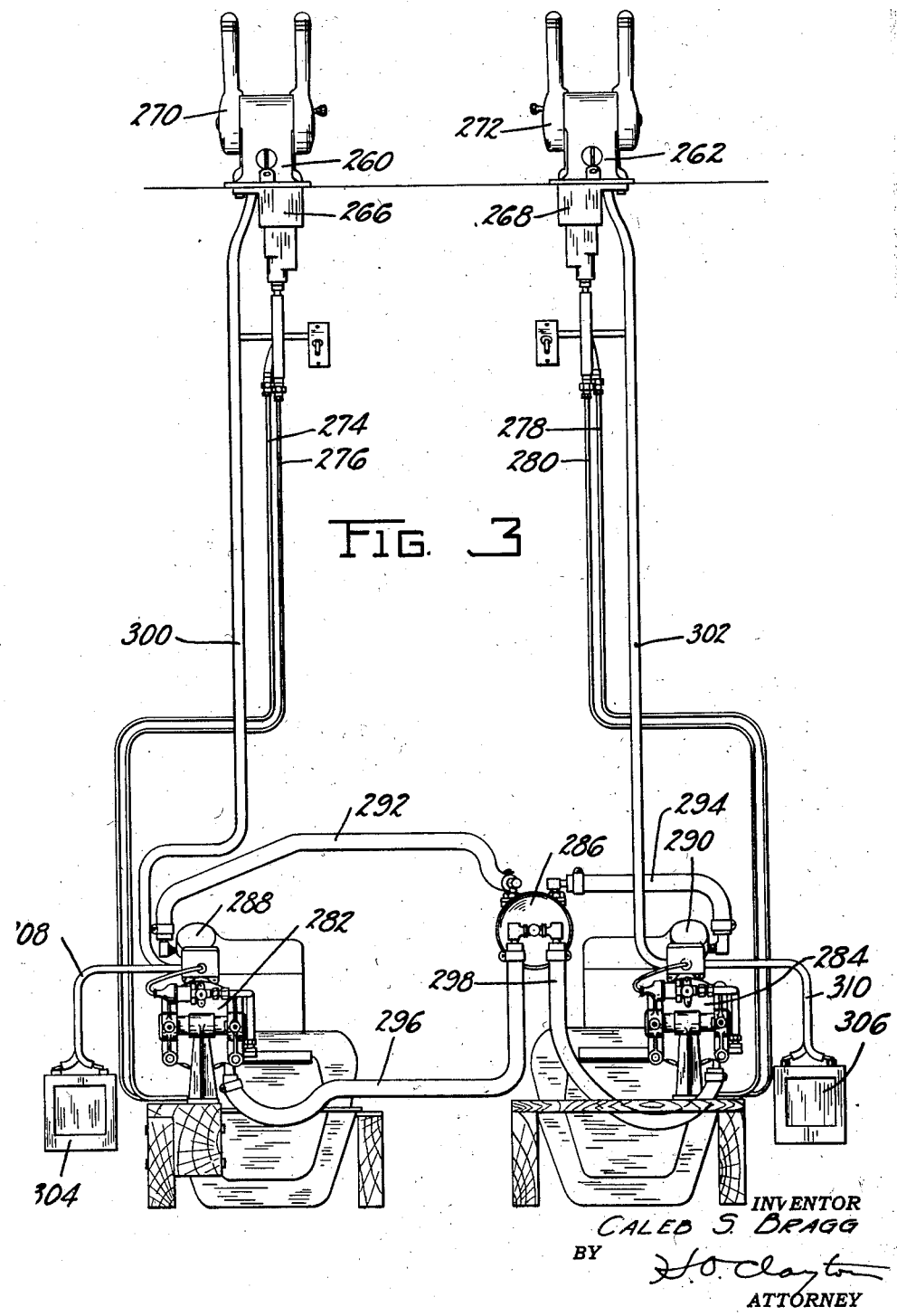

March 4, 1941. C. S. BRAGG 2,234,019
THROTTLE AND TRANSMISSION OPERATING POWER MEANS FOR MARINE CRAFT
Filed March 25, 1938 12 Sheets-Sheet 4

INVENTOR
CALEB S. BRAGG
BY
ATTORNEY

March 4, 1941.  C. S. BRAGG  2,234,019
THROTTLE AND TRANSMISSION OPERATING POWER MEANS FOR MARINE CRAFT
Filed March 25, 1938  12 Sheets-Sheet 5
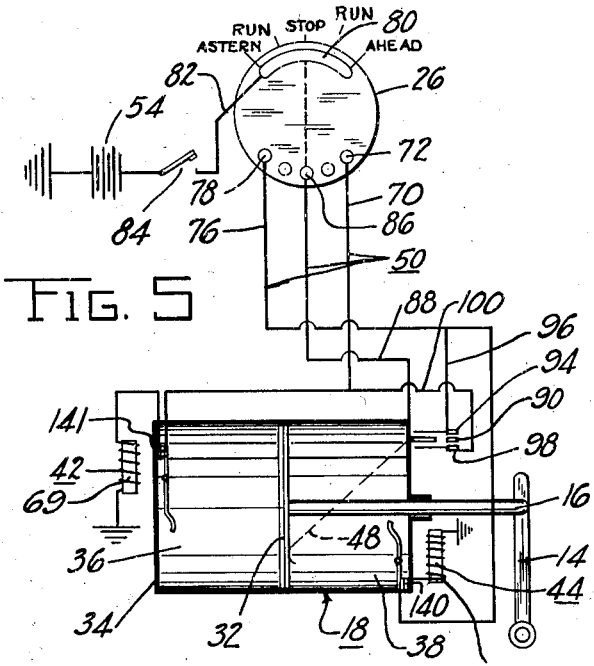
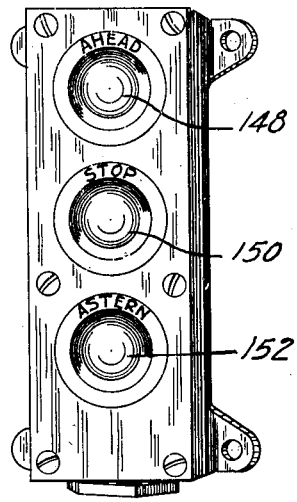
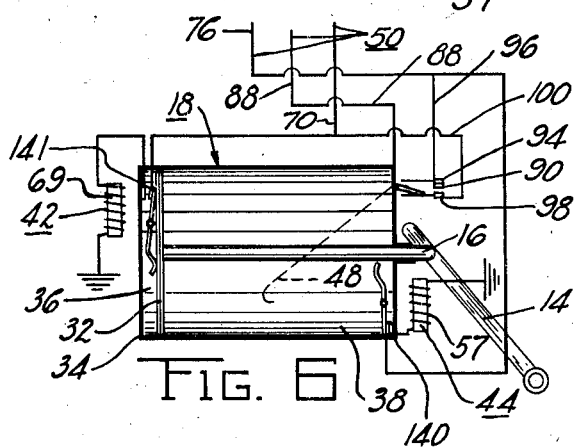
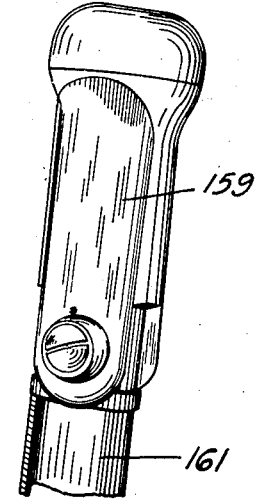
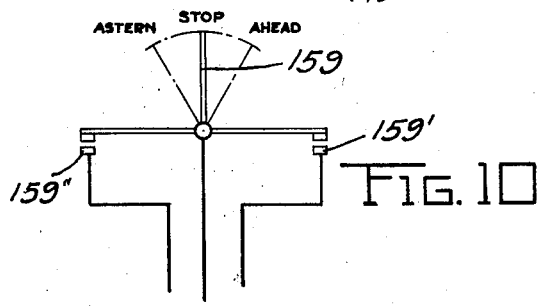
INVENTOR
CALEB S. BRAGG
BY H. O. Clayton
ATTORNEY

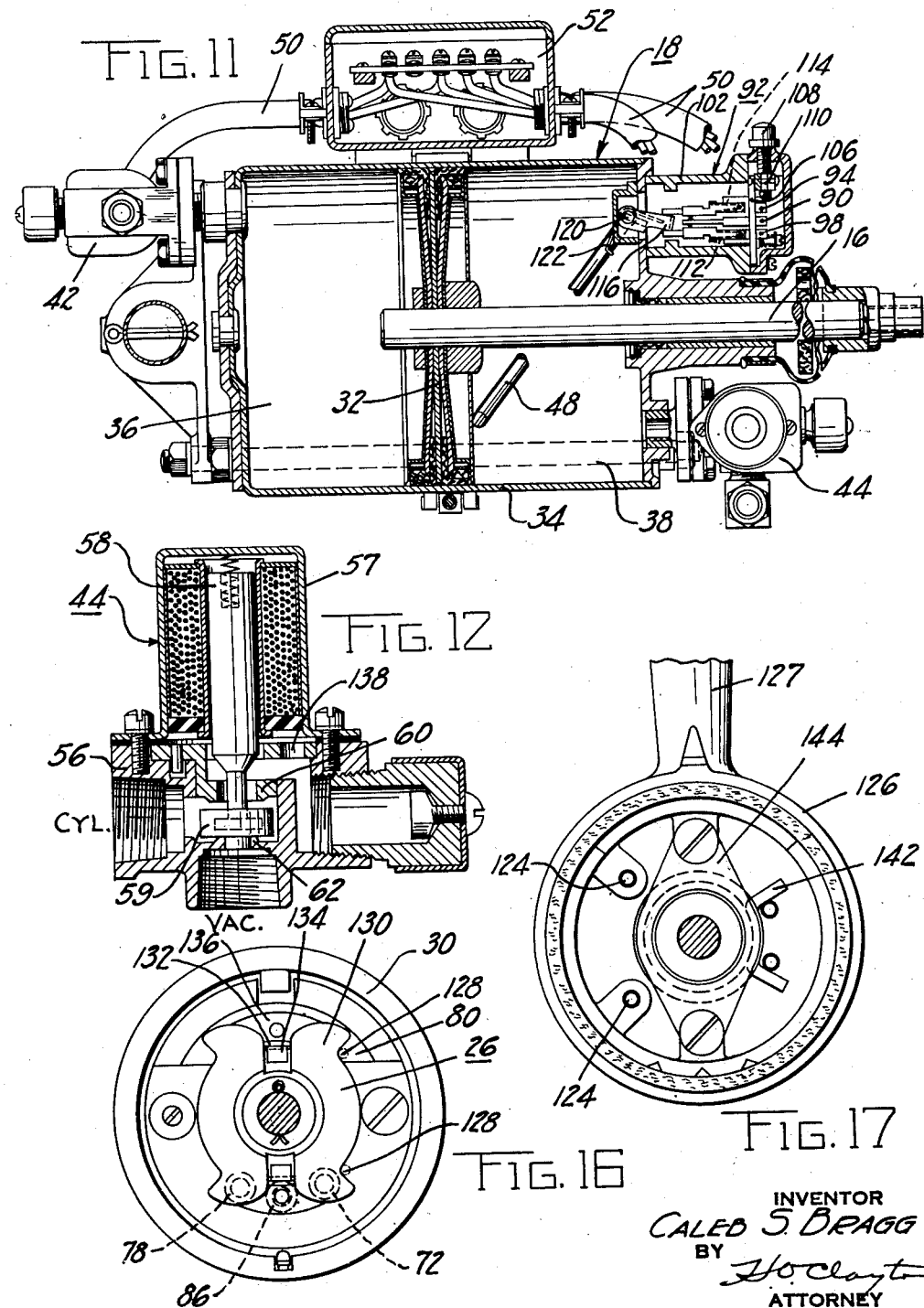

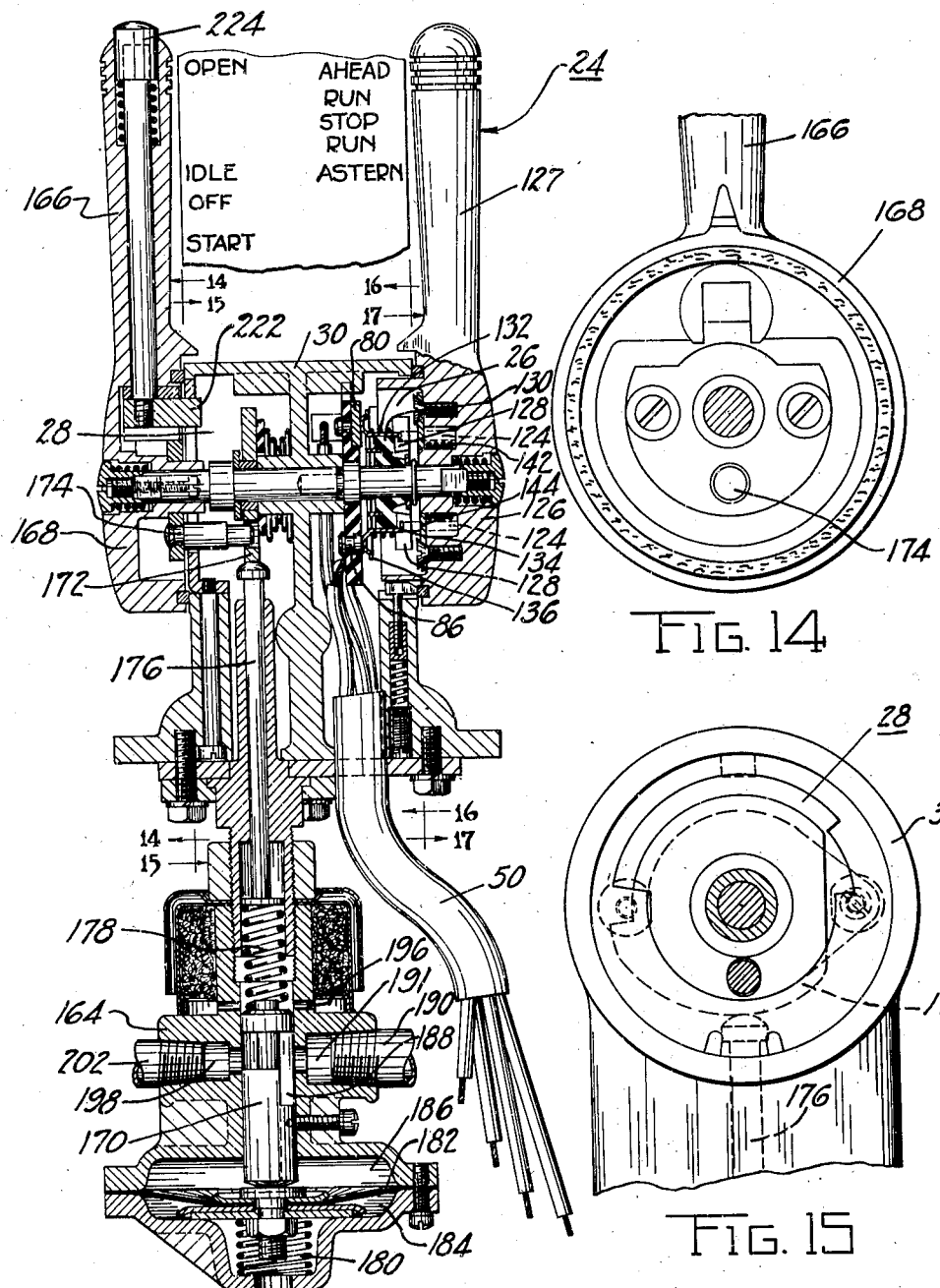

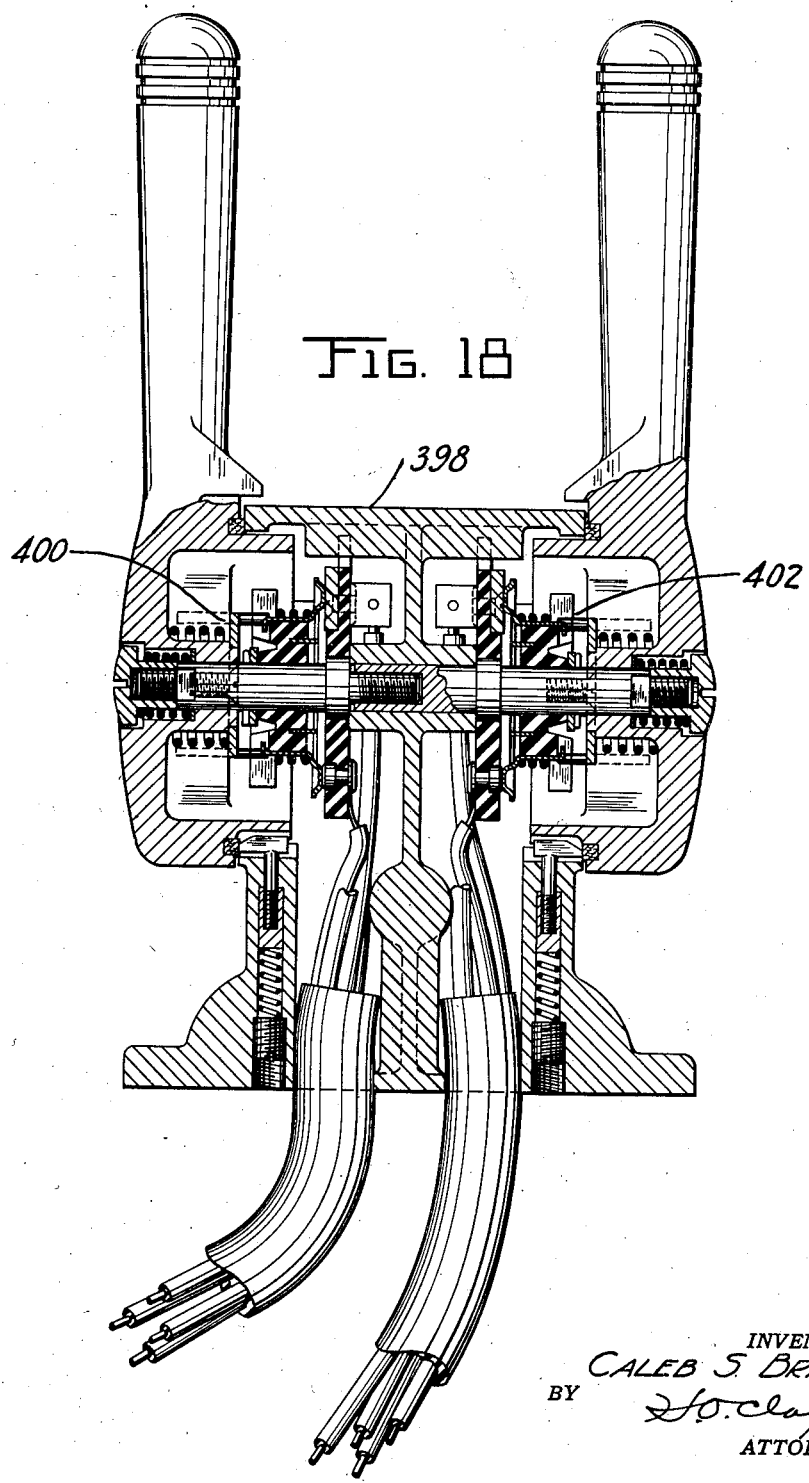

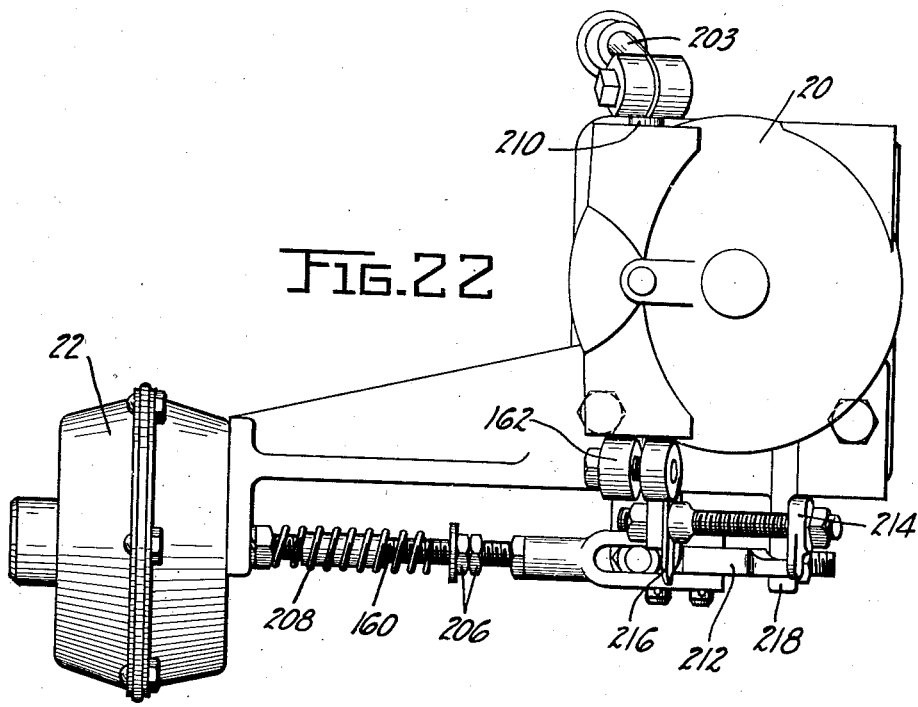
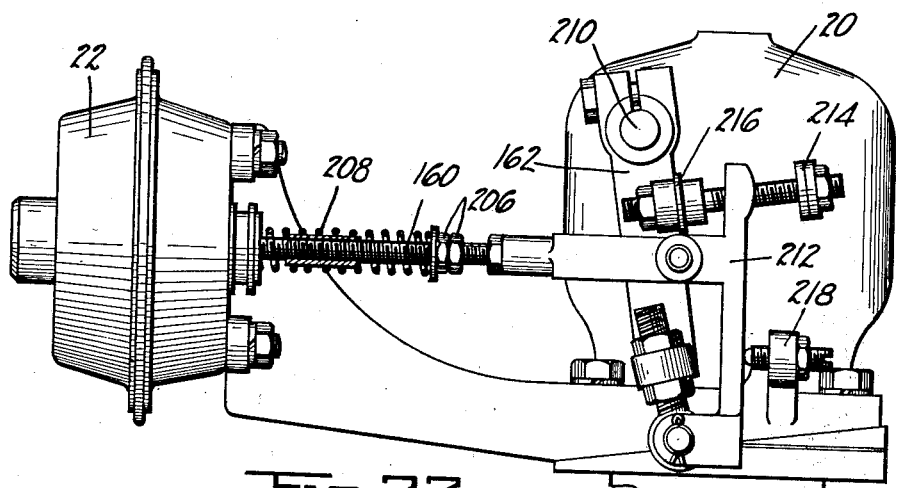

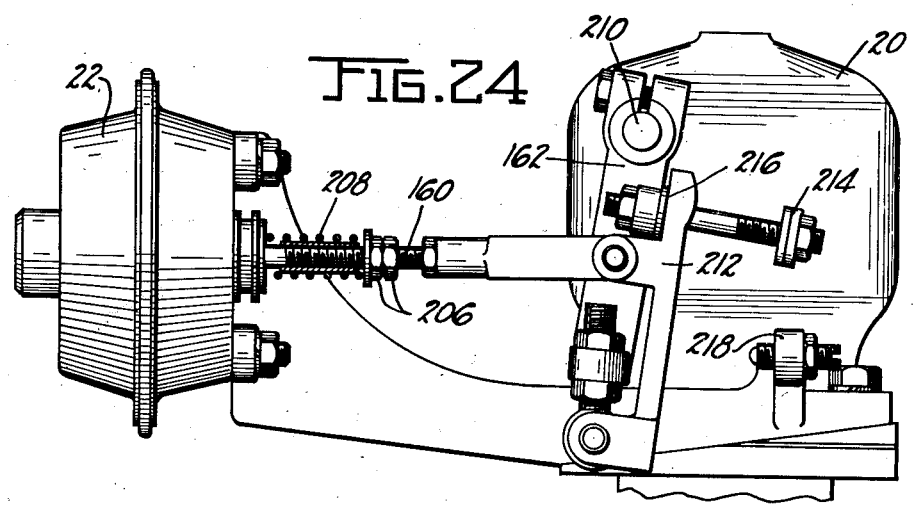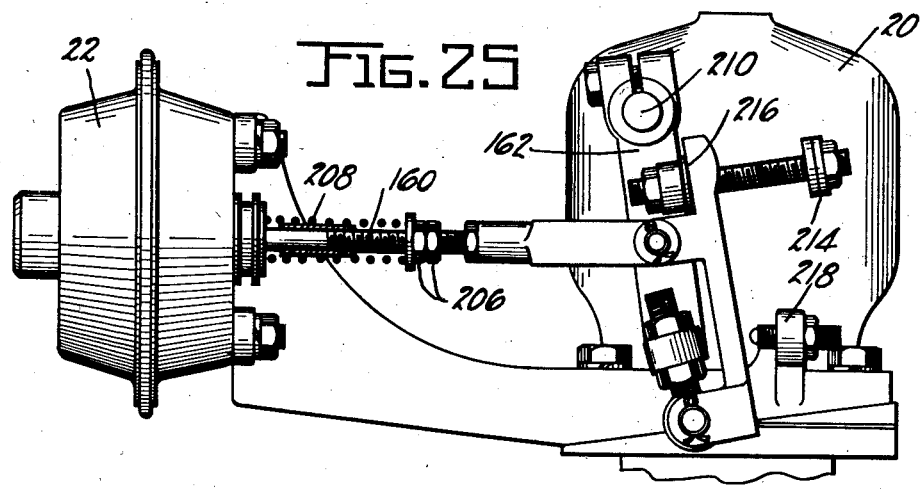

UNITED STATES PATENT OFFICE 2,234,019

THROTTLE AND TRANSMISSION OPERATING POWER MEANS FOR MARINE CRAFT

Caleb S. Bragg, Palm Beach, Fla., assignor to Bendix Products Corporation, South Bend, Ind., a corporation of Indiana Application March 25, 1938, Serial No. 198,031

2 Claims. (Cl. 121—38)

This invention relates in general to means for operating the throttle and transmission or so-called reverse gear of marine craft and in particular to remotely controlled power means for operating these mechanisms.

The increasing weight of such craft and the demand that top speeds of propulsion be increased have necessitated transmission mechanism, the manual operation of which is exceedingly difficult. For example, with such a transmission the clutch springs must necessarily be quite heavy and the lubricating oil of relatively high viscosity. It is accordingly an object of this invention to provide power means for operating the transmission requiring a minimum of skill and a minimum of physical effort to operate.

The invention also contemplates the provision of power means for operating the transmission and control means for the engine such as the throttle or fuel injector, said power means functioning in a manner which fully simulates a conventional manual operation of the transmission. To this end there is provided a miniature or dummy shift lever easily accessible to the pilot, e. g., adjacent the steering wheel, a forward movement of said lever effecting a forward or ahead operation of the transmission to propel the craft forwardly, a rearward movement of the lever effecting a reverse or astern operation of the transmission to propel the craft rearwardly, and a neutral position of the lever neutralizing the transmission to disconnect or unload the engine from the propeller shaft. Adjacent this reverse gear shift lever and mounted on a common pedestal there is provided a miniature lever for controlling power means for operating the throttle or fuel injector, if, for example, a Diesel engine is used in the power plant.

The invention further contemplates the provision of a remote control for the throttle and reverse gear of a marine craft, regardless of its size and whether it has a gasoline or Diesel type of power plant. It is an object of the invention to provide a control whereby all manipulations of the throttles and reverse gears are handled effortlessly, instantly and with lightest of finger-tip movements: all clumsy, rattling, loose-jointed linkages, producing backlash and lost motion, are done away with. A control is provided, including lines extending from the bridge, foredeck or any other convenient station, which may be led around corners, through bulkheads, beams and stringers of the craft.

Another object of the invention is to provide a pressure differential operated motor operatively connected to the transmission or reverse gear, said motor being in part controlled by two three-way valves, one connected with each end of the motor. The three-way valves are operated by solenoids, the latter being controlled by a master or pilot selector switch and by a plurality of selector switches operated by the power element of the motor, said switches being so wired to the solenoids and to each other as to make possible, through the intermediary of the two valves, the aforementioned operation of the transmission.

Yet another object of the invention is to provide an electro-pneumatic type of power means for operating a reverse gear of the holding type wherein the power means is automatically rendered inoperative after, and only after, the transmission has been established in either its ahead position or astern position. The invention also contemplates the provision of power means for operating a reverse gear of the non-holding type which, upon release of the aforementioned miniature control lever, automatically renders the power means inoperative after the transmission has been established in its ahead position but which maintains the power loading of the transmission when the same has been established in its astern position.

A further object of the invention is to provide fluid power means for operating the reverse gear and throttle of marine craft including hydraulic means for operating the throttle, electro-pneumatic means for operating the reverse gear and a common control device, readily accessible to the pilot, for remotely controlling both of said operators.

Yet another object of the invention is to provide power means for operating a plurality of reverse gears and a plurality of engine controls, the power means being remotely controlled by a plurality of controls mounted at convenient stations aboard the ship.

A further object of the invention is to provide a positive means, responsive to a minimum of physical effort on the part of the operator, for controlling a fly-weight type of engine driven throttle or fuel injector controlling governor, said means eliminating the usual direct mechanical coupling between the manually operated control or throttle handle on the bridge and the governor control at the engine. To this end there is suggested, in a preferred embodiment of my invention, a pressure differential operated motor, controlled from the bridge by a manually operated valve and operatively connected with the governor operating arm by means insuring a sufficient opening of the throttle or injector to start the engine when the same is dead and the aforementioned pressure differential operated motor is deenergized.

Other objects of the invention and desirable details of construction and combinations of parts will become apparent from the following detailed description of certain embodiments of the invention, taken in conjunction with the accompanying drawings illustrating said embodiments, in which:

Figure 2 is a view, similar to Figure 1, showing a diagrammatic layout of another embodiment of my invention;

Figure 3 is a view disclosing another embodiment of my invention wherein controls, operative from a single station, are provided for controlling the throttle and reverse gear operating power means for twin engines;

Figure 5 is a view disclosing the electric hook-up of the embodiments of my invention disclosed in Figures 1 and 2;

Figure 1:
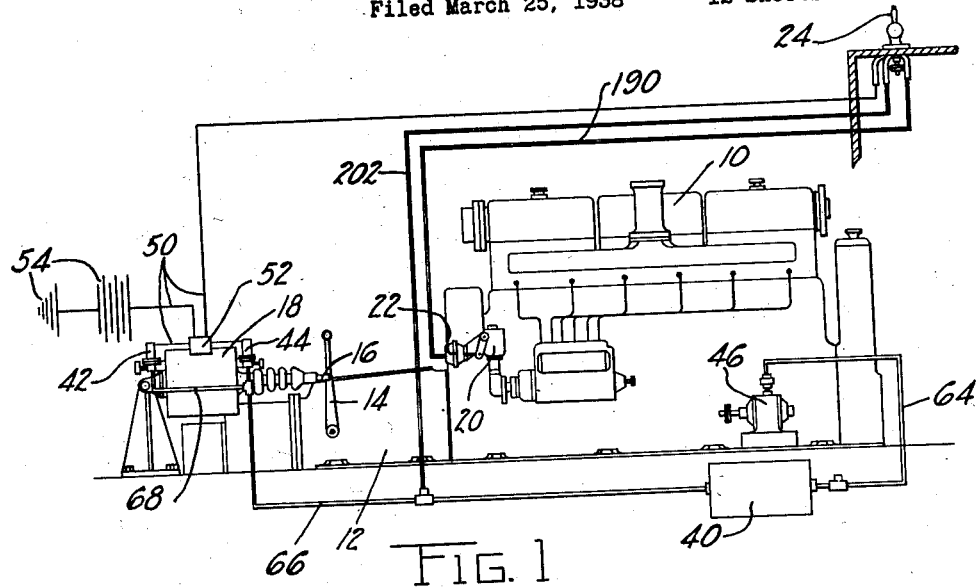
Figure 1 is a diagrammatic view, in side elevation, of the principal elements of the fuel injector and the transmission operating power means constituting the preferred embodiment of my invention.
Figure 21:
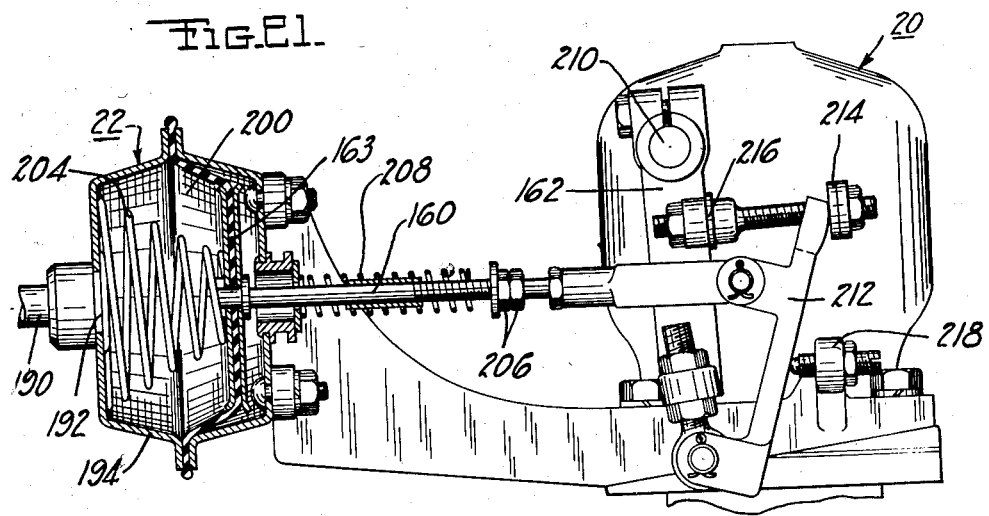
Figure 19:
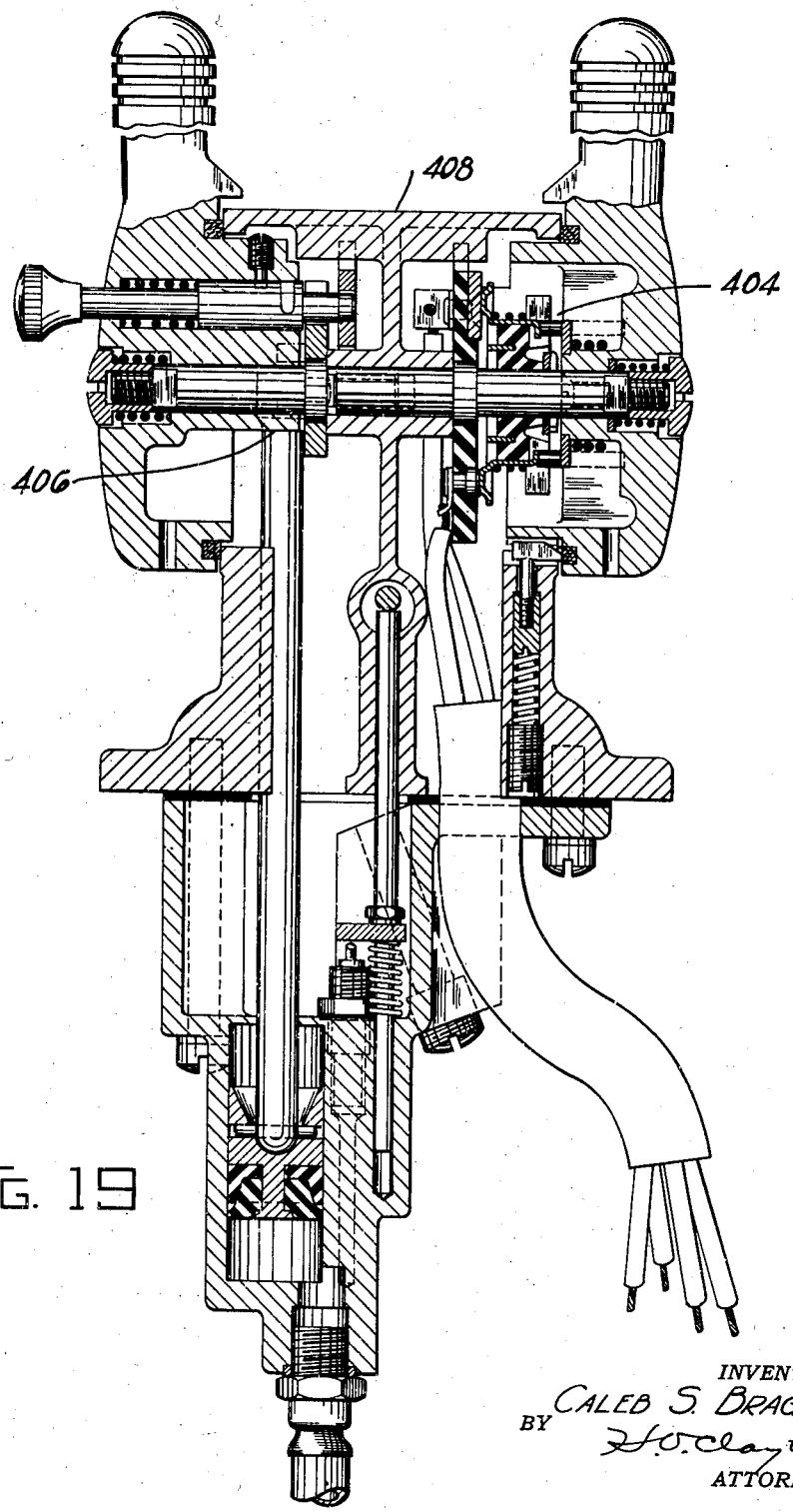
Figure 20:
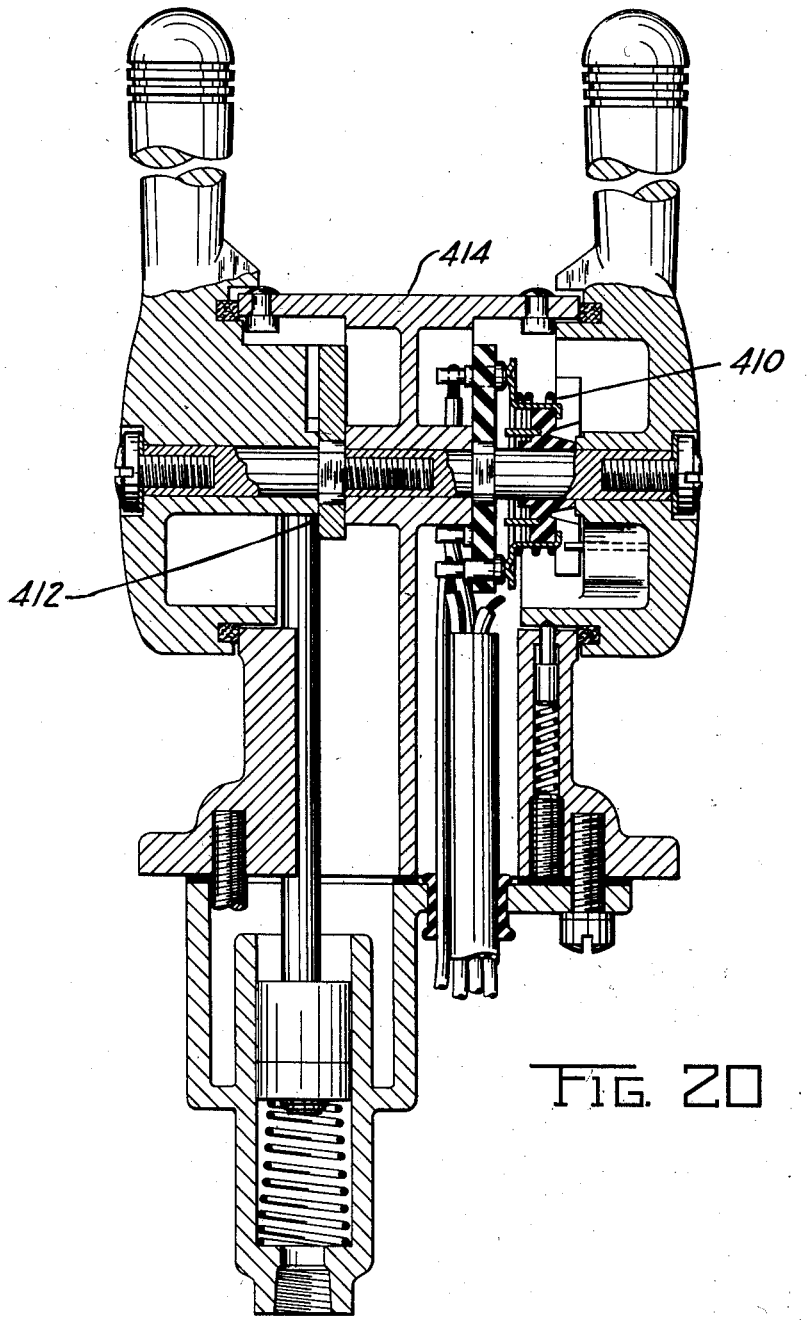

Figure 6 discloses part of the hook-up of Figure 5 with the transmission established in its reverse or astern position;

Figures 7 and 8 disclose, in side elevation, modified forms of master selector switches similar in function to the pedestal mounted master selector switches disclosed in Figures 1 and 2;

Figure 9 is a view, similar to Figure 5, with the master selector switch of Figure 7 substituted for that disclosed in Figure 5;

Figure 10 is a wiring diagram of the selector switch disclosed in Figure 8;

Figure 11 is a sectional view disclosing, in detail, the transmission operating motor of Figures 1 and 2;

Figure 12 is a sectional view disclosing, in detail, one of the solenoid operated three-way valves of the motor disclosed in Figure 11;

Figure 13 is a sectional view disclosing, in detail, the pedestal mounted throttle and transmission controlling selector switch of Figure 1;

Figures 14 and 15 are sectional views of the throttle controlling switch of Figure 13, taken respectively on the lines 14—14 and 15—15 thereof;

Figures 16 and 17 are sectional views of the transmission operating control switch of Figure 13, taken respectively on the lines 16—16 and 17—17 thereof;

Figure 18 is a view, similar to Figure 13, disclosing a pedestal mounted master selector switch mechanism for controlling two reverse gear transmissions;

Figures 19 and 20 disclose, in section, modified forms of pedestal mounted throttle and transmission controlling master selector switches;

Figure 21 is a view, partly in section, disclosing, in detail, the pressure differential operated motor for operating the governor controlled throttle or fuel injector of the engine;

Figure 22 is a top plan view of the power actuator mechanism of Figure 21;

Figures 23 to 25 are views disclosing, together with Figure 21, the successive positions of the mechanism during the operation thereof.

Figure 26:
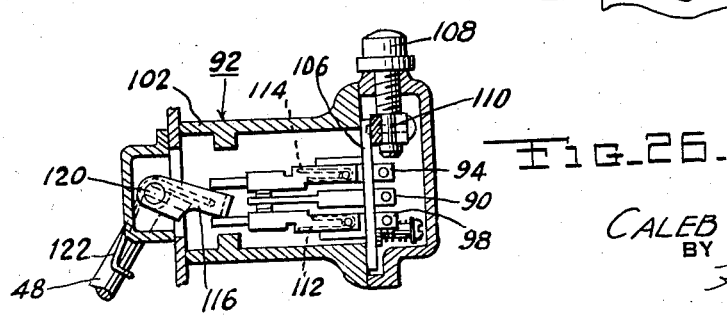

Figure 26 is a sectional view disclosing in detail the so-called neutral switch mounted on the transmission operating motor.

As disclosed in Figure 1, elements of the power plant and my invention cooperating therewith include an engine 10 and a reverse gear or transmission 12 operably connected to a propeller shaft, not shown. To a manually and power operated shift lever 14 there is operatively connected, by means of a connecting rod 16, an electro-pneumatically controlled double-acting pressure differential type of motor 18. There is also disclosed a fuel injector controlling governor 20 arranged to be operated by a power mechanism including an actuator 22.

Both of the aforementioned power means for operating the transmission and the injector are controlled by a manually operated selector mechanism 24, preferably mounted on the bridge of the craft adjacent the steering wheel and remaining controls. As disclosed in detail in Figures 13 to 17, inclusive, the mechanism 24 includes a master selector switch 26 for controlling the transmission operating motor 18 and also includes a valve mechanism 28 for controlling the operation of the injector operating motor 22. Both the switch and valve mechanisms are incased within a pedestal, indicated by the reference numeral 30.

The electro-pneumatic reverse gear operating power means constituting one of the principal features of my invention is diagrammatically disclosed in Figures 5 and 6, wherein the gear mechanism is arranged to be operated by the lever 14, the latter being operably connected by the link 16 to a piston 32 reciprocable within a double-ended cylinder 34. The cylinder and piston together constitute the aforementioned motor 18. End compartments 36 and 38 of the cylinder are adapted, as will be more fully described hereinafter, to be alternately connected to a source of vacuum, preferably tank 40, and to the atmosphere by means of power operated three-way valves 42 and 44. The tank is preferably evacuated by means of an engine driven vacuum pump 46. The motor 18 is intermittently energized to selectively position the reverse gear mechanism in any one of its ahead, neutral or astern positions, as indicated by the several positions of the lever 48 in Figures 5, 6 and 9. The valves 42 and 44 are preferably solenoid operated, wiring harness 50, Figure 1, interconnecting the solenoids, the aforementioned selector switch 26, a so-called junction box 52 and a battery 54. Solenoid operated valve 44 is disclosed in detail in Figure 12.

There is disclosed in Figure 11 the details of the motor 18 of the transmission operating power mechanism and in Figure 12 the details of each of the aforementioned three-way valves and the solenoids for operating the same. As shown in Figure 12, the valve mechanism and operating means therefor comprise a casing 56 to which is secured the solenoid 57. To the armature 58 of the solenoid is secured the three-way valve member 59 adapted to seat at 60 and 62 to alternately connect the motor unit with the vacuum or the atmosphere. The valve 44, Figure 11, and the operating means therefor are duplicates of the valve 42 and its operating means. Briefly describing the pneumatic connections, conduits 64, 66 and 68 serve to interconnect the vacuum pump 46, vacuum tank 40 and motor 18.

Describing the electrical hook-up, Figure 5, solenoid 69 is connected, by wiring 70, with a contact 72 of the selector switch 26; solenoid 57, for operating the valve 44, is connected, by wiring 76, with contact 78 of the selector switch; and a contact 80 of the switch is connected, by hot wire 82, to the battery 54, an ignition switch, not shown, and a cut-out switch 84 being interposed in series in his connection. A neutral contact 86 of the switch 26 is connected, by wiring 88, to a contact 90 of a so-called neutral switch mechanism 92, Figure 11, one contact 94 of the latter being connected, by wiring 96, to the wiring 76 and another contact 98 of the neutral switch being connected, by wiring 100, to the wiring 70.

Figures 11 and 12 disclose the details of the motor unit 18 and neutral switch 92, the latter comprising a casing 102 mounted upon the cylinder 34 and housing the aforementioned contacts 90, 94 and 98, which are pivotally secured to a plate 106, the latter being adjustable by means of a screw 108 threadedly mounted in a bracket 110 secured to the plate 106.

The contacts are biased by springs 112 and 114 into engagement with the contact 80 but are normally held spaced from said contact by an end portion 116 of the lever 48 pivoted at 120 within the cylinder 34. The lever is preferably biased, by a spring 122, into engagement with the piston 32: accordingly, the lever 48 follows the piston 32 as it moves to the left. The plate 106, to which the contacts 90, 94 and 98 are secured, is adjustable by the bolt 108 with respect to the lever 48 in order to determine the neutral position of the piston 32. This adjustment is made necessary in view of the various neutral positions of the lever 14, Figure 1, on different transmissions.

Describing now in brief the operation of the previously described mechanism and incidentally the details of the master selector switch 26, said switch is placed in its neutral or stop position, Figure 5, whereupon the starter and ignition switches are operated to start the engine. The electro-pneumatic power means may now be operated, as disclosed in Figures 5 and 9, to place the transmission or so-called reverse gear in its ahead position. The selector switch 26 is accordingly placed in its ahead position to energize the solenoid 57 of three-way valve 44. In moving to this position, pins 124, Figure 17, extending from a rotatable cap member 126 contact indentations 128 in an insulator 130. A spring 132, Figure 13, serves to secure the insulator 130 to a conductor plate member 134 housed within the insulator. Upon rotation of the cap member 126 by means of a handle 127, the insulator and plate are moved as a unit to place a projection 136 on the plate in contact with the contact 78. The armature 57 is accordingly moved upwardly, Figure 12, to seat the valve 59 upon its seat 60, closing off the communication between the motor compartment 38 and the atmosphere via valve ports 138 and interconnecting the tank 40 with said compartment via conduit 66. The compartment 36 of the motor, of course, remains in communication with the atmosphere, and under the load of the atmosphere the piston 32 is moved to the right, Figure 9, to its ahead position.

In such position the transmission is established to rotate the propeller shaft and move the boat forwardly. According to an important feature of the invention, the lever 48, when in its ahead position, contacts a switch 140 to break the circuit to the solenoid 57 and thus obviate a drain on the battery. A similar switch 141 functions in the same manner to break the circuit to the solenoid 69 of three-way valve 42.

As disclosed in Figures 13 and 17, a return spring 142, interposed between a plate 144 and the cap 126, serves to automatically return the plate to the "run" position, when the operator releases the lever 127 of the selector. As is made clearer from an inspection of Figure 5, the two "run" positions disclosed break the circuits to both solenoids 57 and 143; therefore, should such a return spring 142 be used, it would be unnecessary to provide the aforementioned cut-off switches 140 and 141. Nevertheless, to insure a breaking of the circuits and make the control fool proof, both the return springs and the cut-off switches are preferred. One or the other of the switches 140 and 141 might fail to function, in which event the spring 142 would aid in insuring a breaking of the circuits. Should a so-called non-holding type of reverse gear be used, then both the cut-off switches and the return springs should be dispensed with, inasmuch as it would be necessary to maintain a constant loading on the reverse gear.

With a movement of the piston 32 to the right, as just described, the lever 48 is rotated counter-clockwise, permitting contact 98 to move into contact with contact 90, under the action of spring 112. Thus with the establishment of the ahead position of the transmission, means are automatically brought into operation, by power, to in part establish a circuit between the battery and solenoid 69. Should the operator now desire to neutralize the transmission, he needs but to move the selector switch to its neutral position, thus completing the circuit to energize the solenoid 69. The valve 42 is thus operated to again energize the motor 18 to move the piston 32 and permit a movement of the lever 118 back to its neutral position. As disclosed in Figures 5 and 6, the operation of the mechanism to establish the astern position of the transmission will be obvious from the aforementioned description, together with a disclosure of the drawings.

The solenoid circuit may, by means of the switch 141, be cut out in establishing the astern position. However, if the operator moves the control to the "run" position, a breaking of the circuit is insured. With such a construction, electric current is only used when the gears are being changed. The piston and connected parts are then under no load and are free to float and find their own centers.

There is disclosed in Figures 7 and 9 a selector switch of the push-button type, which may be used in lieu of the pedestal mounted switch 26 disclosed in Figures 5 and 13. Push-buttons 148, 150 and 152, Figure 7, control contacts 154, 156 and 158, Figure 9, to select any one of the ahead, stop, or astern operations of the transmission operating power means. When depressed, the ahead and astern push-buttons will effect an engagement of their respective clutches for the corresponding rotation of the propeller shaft. When depressed, the stop pushbutton 150 will disengage either clutch if engaged. The push-button switches, while depressed, make or complete the circuit to energize one solenoid, and the instant they are released break the circuit to de-energize that solenoid. Depression of the button firmly for one or two seconds effects a complete engagement or disengagement of the clutch.

The pedestal type of control switch 26, with the return spring 142 and the cut-out switches 140 and 141 omitted, is, of course, preferable to the push-button type of switch in operating reverse gears of the constant pressure type.

As disclosed in Figures 8 and 10, a so-called lever handle selector switch may be employed in lieu of the bridge mounted selector switch 26. Describing the construction and operation of this type of switch, movement of a three-armed lever member 159 clockwise or counterclockwise alternately closes contacts 159' or 159" to establish the transmission in its ahead and astern positions. As clearly disclosed in Figure 10, the stop position breaks both contacts. The lever member is pivotally mounted on the manually and power operated lever 161: therefore, it follows that the neutral switch 92 may be dispensed with, in this installation the power means functioning as an assistor or so-called booster to aid the operator in manually moving the lever to operate the transmission.

Referring now to one of the most important features of my invention, there are disclosed in Figures 13 to 15 and 21 power means, preferably of the pressure differential operated type, for operating either the throttle of an internal-combustion engine using gasoline for fuel or the injector of a Diesel engine. The governor used in conjunction with the throttle or injector, particularly the latter, exerts an appreciable reactive force, increasing with engine speeds, tending to close the fuel injector. This force has to be continuously counteracted when the engine is running, making necessary in the conventional construction a ratchet or locking type lever for operating the governor operating arm, and incidentally the injector operating arm. This lever must be locked in each position before the handle can be released by the operator and, in order to permit the governor to function while its operating lever is locked, a spring is incorporated in the connection between the governor operating arm and the lever.

The power operated injector operating mechanism of my invention supplants such a manually operated control and provides a positive means, responsive to finger-tip pressure and conveniently positioned on the craft, for example, on the bridge, for controlling the fly-weight type of engine driven governor used to operate the fuel injector or the throttle. With the instant invention, no direct mechanical coupling is necessary between the manually operated control or throttle handles on the bridge and the engine.

Describing now the construction of the aforementioned power means, the principal elements of the same include the aforementioned selector valve mechanism 28, mounted within the pedestal 30 in abutting relation to the switch 26, the valve mechanism serving to control the operation of the pressure differential operated motor 22, a power element or piston 163 of the motor being operatively connected by a rod 160 with a governor operating arm 162. Referring to Figures 13, 14 and 15, disclosing the details of the control valve mechanism, a valve housing 164 is attached beneath the body of the pedestal 30. The valve mechanism further includes a control handle 166 extending from a rotatably mounted cap 168 to operate a piston valve 170 by means of a cam 172 operatively connected to a pin 174, a push rod 176, and compression spring 178. The valve 170 is also operated by a compression spring 180 and a diaphragm 182, the lower face of the latter being exposed in chamber 184 to atmospheric pressure, while the upper face is subjected in chamber 186, through passage 188 in piston valve 170, to the degree of vacuum existing in the vacuum cylinder, thereby causing the diaphragm to exert an upward force. The piston valve, when in the raised position, will connect, via conduit 190, valve port 191 and recessed portion 188 of the valve 170, the vacuum port 192 of a cylinder 194 of the motor 22 with an atmospheric port 196 in the valve mechanism. In this position of the valve the motor 22 will be deenergized.

When the control handle 166 is moved toward the position indicated in Figure 13 as the "open" position, cam 172 depresses push rod 176, spring 178 and valve 170, thereby connecting a suction port 198 of the valve with the port 192 of the motor 22 to produce or increase the degree of vacuum within a motor chamber 200. The port 198 is connected with a conduit 202, which is preferably tapped into conduit 66 at a port intermediate the tank 40 and the transmission operating motor 18. As the degree of vacuum increases, the diaphragm 182, exerting a greater force, moves the valve 170 upward, compressing the spring 178 to close the suction port 198 and so maintain a degree of vacuum within the cylinder and chamber 200, which just counterbalances the degree of compression of spring 178. This operation, which is known as a valve lapping operation, is repeated each time the handle is moved toward the "open" position until the handle arrives at such position, in which position the spring 178 is fully compressed and has provided the maximum degree of vacuum permitted by the strength of this spring. It will be noted that with each lapping operation of the valve, as the same is moved toward its open position, the force necessary to move the handle 166, that is to again crack the valve, is progressively increased. In other words, the force necessary to open the valve is in direct proportion to the degree of such opening. This operation is known in the art as a valve "feel," the operator being apprised of the degree of opening of the valve by the effort necessary to operate the same.

When the control handle 166 is moved toward the "idle" position, Figure 13, from the above-described "open" position, the cam 172 permits the diaphragm 182 and spring 180 to raise the valve 170 and push rod 176, thereby connecting the atmosphere with port 192 of the vacuum cylinder and also with chamber 186. As the degree of vacuum in chamber 186 decreases, the diaphragm, exerting less force, permits the spring 178 to expand to move the valve 170 downwardly to close the atmospheric port 196 to again lap the valve and maintain a degree of vacuum in chamber 186 which counterbalances the degree of compression of spring 178. This operation continues each time the handle is moved toward the "idle" position, in which position the spring 178 has expanded to the extent permitted by the cam, and thereafter maintains a fixed degree of vacuum within the motor cylinder 194 at "idle" position. The control handle may be then moved to its "off" position to again reduce the degree of vacuum within the cylinder 194.

When the control handle is moved from either the "idle" or "off" positions to the "start" position, the cam 172 permits the diaphragm 182 and the spring 180 to raise the valve 170, as the spring 178 reaches its fully extended position, to open the atmospheric port 196 and connect the chambers 200 and 186 with the atmosphere. At this position of the control handle the motor is permanently vented to the atmosphere.

With the above-described control valve, any degree of vacuum required to give the desired engine speed will be maintained within the chambers 186 and 200, regardless of inherent leaks or of any movement of the governor arm 162 and piston 163. The diaphragm 182 will automatically move downwardly to open the suction port 198 if the degree of vacuum within the chambers 186 and 200 decreases, and will automatically move upwardly to open the atmospheric port 196 if the degree of vacuum increases.

Describing now the motor 22 and its connection with the governor operating arm 162, disclosed in Figures 22 to 25, inclusive, the piston 163 within the cylinder 194 is of sufficient size to hold the fuel injector open against the reactive force of the governor weights throughout a predetermined range of R. P. M.'s for the engine.

As disclosed in Figures 1 and 22 and following the conventional construction, a fuel injector operating arm 203 connected with the governor operating arm 162 is, by means of the governor 20, forced toward a closed position by a loading in direct proportion to the speed of the engine. As disclosed in Figure 21, the piston 163 is moved toward the closed end of the cylinder by suction and toward the open end, that is to the right, by a return spring 204. The piston rod 160 is provided with an adjustable nut 206 to engage an idling spring 208, described hereinafter. A governor shaft 210 is provided with three arms: an integral arm, not shown, which is engaged by the governor weights when raised by centrifugal force; the fuel injector operating arm 203; and the governor operating arm 162, to which is pivotally connected a pick-up lever 212. The lever 212 is positioned to engage one or more of adjustable stops 214, 216 and 218. The extent of opening of the fuel injector operating arm 203 is determined by the position of the governor operating arm 162, which is acted upon by three forces: the so-called idling spring 208; pressure differential operated piston 163 of the motor 22; the piston return spring 204 and the governor weights when revolving.

Describing now the operation of the injector operating power means, in the "start" position of the control handle 166, with the engine stopped and no vacuum in the motor 22 or available in the tank 40, the spring 208 aided by the spring 204 will move the piston rod 160 and the pick-up lever 212 to the right to engage the stop 218, and thereby move the governor arm 162 to the left to open the injector to the extent determined by the adjustable stop 214, as disclosed in Figure 21.

When the engine starts, the governor weights will revolve and exert a force, increasing with engine speed, tending to move the arm 162 to the right to close the injector. As disclosed in Figure 23, the forces of the governor weights and of springs 208 and 204 will immediately counterbalance each other upon fulcrum point 218 and provide an injector opening for a slow speed of the engine.

When the control handle is moved into the operating range, between "idle" and "open," the chamber 200 will be evacuated to cause the piston 163 to exert a force, overcoming the force of springs 208 and 204, to move the pick-up lever 212 to the left, Figure 24, to engage stop 216, and thereafter directly control the movements of the governor arm 162, subject to the reactive forces of the governor weights.

The reactive force of the governor weights increases with the speed of the engine, while the force of the piston 163 reflecting the degree of vacuum within the motor increases with movement of the control handle 166 toward the "open" position. Therefore, governor arm 162 will be moved to the left to open the injector when the force of the piston is raised above the force of the governor weights, and governor arm 162 will be moved to the right to close the injector when the force of the piston is lowered or becomes less than the force of the governor weights. The governor arm will remain stationary only when the forces of the piston and governor weights counterbalance each other. The governor arm is accordingly not held fixed but allowed to move when necessary to keep the automatic control of the engine revolutions, should, for example, the propeller come out of the water, the engine shaft break, or the load suddenly change for any reason.

When the control handle is in the "idle" position, providing a fixed degree of vacuum in the chamber 200, the idling spring 208 may be adjusted by the nut 206 to increase or decrease the force exerted by the piston, and so permit the governor arm 162 to be positioned for the desired idling speed of the engine.

As disclosed in Figure 25, when the control handle is in the "off" position, the degree of vacuum is reduced until the force of the piston just counterbalances the combined forces of springs 208 and 204, at which time the reactive force of the governor weights will close the injector and stop the engine. In the "start" position, the motor is vented to the atmosphere; therefore, as with the "off" position, the injector is in this position moved to stop the engine.

Elaborating on the use of the injector control, the pedestal mounted handle 166 may be moved with a minimum of physical effort from "start" position, through "off" and "idle" to the "open" position, and from "open" to "idle." At the latter position, the handle is constructed to engage a stop 222 to prevent the same from being unintentionally moved beyond the "idle" position, as the engine will stop when the handle reaches and remains in the "off" or "start" positions. After a depression of a spring operated button 224 at the end of the handle 166 to clear the stop, the handle may be moved to the "off" or "start" positions to stop the engine.

Before starting the engine, the handle 166 is preferably moved to the "start" position and, after the engine starts, the handle is left in "start" position for a few moments to produce vacuum within the tank 40 or for a few minutes to warm up the engine. The handle is then moved quickly from "start" through "off" to or slightly beyond the "idle" position and then returned slowly to "idle" for idling R. P. M.'s of the engine. The R..P. M.'s of the engine will increase as the handle is moved from "idle" toward "open" position and will be maximum when the handle arrives at the "open" position, provided the reverse gear transmission is engaged. When the transmission is disengaged and the engine is running freely, the maximum R. P. M.'s will be reached when the handle is moved a relatively short distance from "idle." To stop the engine, the button 224 at the end of the handle is depressed and the handle moved to the "off" position and left in said position until the engine stops.

There is thus provided an injector controlling power means, including the springs 208 and 204 and the remotely controlled motor 22, for insuring the desired opening of the governor controlled injector. The springs and motor yieldingly operate the throttle governor while allowing the governor to function, if necessary, to prevent excessive R. P. M.'s of the engine.

Figure 2 discloses another embodiment of my invention wherein a reverse gear 226, of conventional design, is operatively connected, by means of a rod 228, to the power element, not shown, of a double-ended electro-pneumatically controlled motor 230 pivotally mounted upon a mounting bracket 232. In this modification of my invention, the source of power constitutes a reservoir 234, which is maintained evacuated by means of its connection, via a conduit 236, with the intake manifold 238. The reservoir is placed in fluid transmitting connection with motor control means by means of a conduit 240, said means including two solenoid operated three-way valves 242 and 244. The valve operating solenoids are remotely controlled by a selector switch 246, mounted upon a pedestal 248: the latter also houses actuator mechanism 250 of hydraulic power means for operating the throttle 252 of the internal-combustion engine 254. The throttle operating hydraulic actuator mechanism, including a double-acting actuator 255 mounted in the pedestal 248 together with the remainder of the force transmitting fluid link mechanism including conduits 256 and 258 connected to a double-acting actuator 259, is not of itself claimed herein.

There is disclosed in Figure 3 power means for operating the throttle and reverse gear mechanism of a twin engine power plant, said means being controlled from a single station. In this embodiment of my invention, control pedestals 260 and 262, conveniently mounted adjacent a steering wheel, not shown, each houses part of hydraulic actuator mechanisms, including master cylinders or actuators 266 and 268, for operating the throttles, not shown. The pedestals also house reverse gear controlling selector switches operated by handles 270 and 272. The actuators 266 and 268 are placed in fluid transmitting connection with the remainder of the hydraulic actuator mechanism by conduits 274, 276, 278 and 280. The two reverse gear mechanisms or change-speed transmissions, not shown, are operated by motors 282 and 284, each being of the same construction as the motor 230 disclosed in Figure 2.

Similar to the control mechanism of the power means disclosed in Figure 2, a vacuum tank 286, connected to intake manifolds 288 and 290 by conduits 292 and 294, constitutes a source of power to energize the motors 282 and 284. Duplicating the control means of the motor 230, Figure 2, the motors 282 and 284 are provided with control means mounted on the motors, said means each including two three-way valves for controlling the two end compartments of each of the motors. The valves are connected to the tank 286 by conduits 296 and 298 and are operated by solenoids, said solenoids being controlled by the aforementioned selector switches and connected thereto by wiring harness 300 and 302. Batteries 304 and 306, wired to the solenoids by harness 308 and 310, constitute the source of power for energizing the solenoids.

Figure 4:
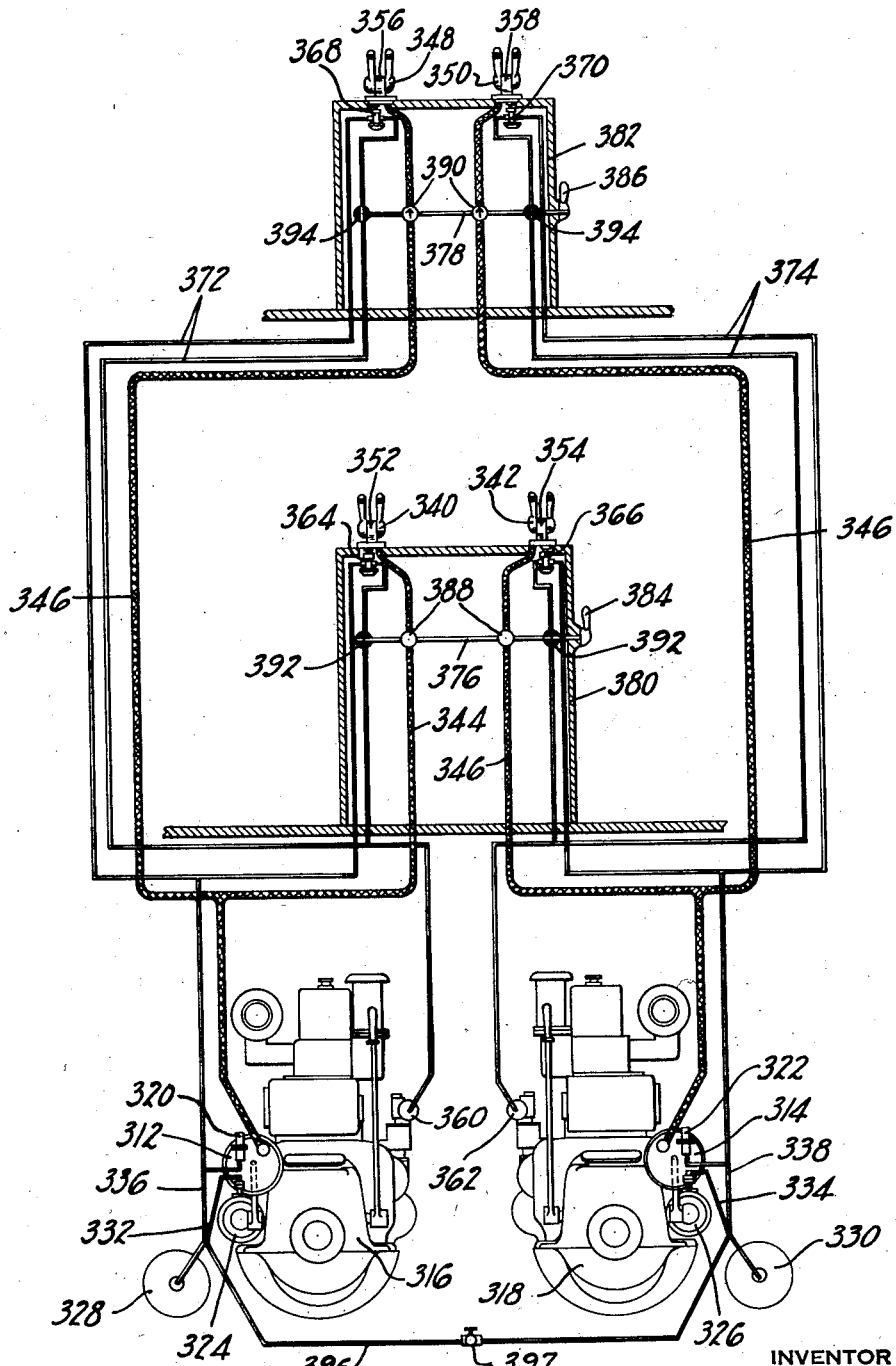
Figure 4 is a diagrammatic view, similar in general to Figure 3, disclosing a two-station control for twin engine controlling power means.

There is disclosed in Figure 4 a two-station control for a twin engine throttle and transmission operating power means. Double-acting actuators 312 and 314 are operatively connected to the reverse gear units, not shown, of power plants 316 and 318. Valve units 320 and 322, similar to the transmission actuator valve mechanism disclosed in Figure 1, in part control the operation of the actuators 312 and 314 respectively. Engine driven vacuum pumps 324 and 326 are connected respectively with vacuum tanks 328 and 330 by conduits 332 and 334, the tanks being connected to the valve units 320 and 322 by conduits 336 and 338, similar to the construction disclosed in Figure 1. As with the mechanism disclosed in Figures 1, 11 and 12, the valve units are electrically controlled by solenoids, the latter being controlled by selector switches 340 and 342, connected by wiring 344 and 346 to the solenoids. Preferably connected in parallel with control switches 340 and 342 are selector switches 348 and 350 for controlling the transmission operating power means. The above-mentioned four switches are preferably mounted in pedestals 352, 354, 356 and 358.

Describing now the throttle operating power means disclosed in Figure 4, pressure differential operated actuators 360 and 362, similar to the actuator disclosed in Figure 21, are operatively connected to the engine throttle or injectors, if the engines are of the Diesel type. The actuators 360 and 362 are placed in fluid transmitting connection with the tanks 328 and 330 by conduits, as clearly disclosed in Figure 4, and control valves 364 and 366 of the type disclosed in Figure 13 are incorporated in said conduits. The valves 364 and 366 are mounted, together with the switches 340 and 342, in the pedestals 352 and 354, and, as clearly disclosed in Figure 4, valves 368 and 370, mounted in pedestals 356 and 358, are connected to conduit systems including the conduits 372 and 374, supplementing the valves 364 and 366 in controlling the operation of the throttle operating actuators 360 and 362.

One feature of my invention lies in the means for rendering the above-described throttle and transmission operating power means inoperative. To this end there are provided shafts 376 and 378, rotatably mounted in the supports 380 and 382 for the aforementioned pedestals. The shafts are preferably manually operated by handles 384 and 386, said shafts, when rotated, serving to operate cut-out switches 388 and 390 and cut-out valves 392 and 394. It will be noted that, with the mechanism disclosed, all of the throttle and transmission operating power means at one station may be cut out of operation with a single turn of either of the handles 384 or 386.

Another feature of my invention lies in the inclusion of a conduit 396 interconnecting the tanks 328 and 330 to insure a source of vacuum to operate at all times the injectors and transmissions of both engines. A valve 397 interposed in the conduit 396 serves to regulate the degree of vacuum within the tanks.

There are disclosed in Figures 18, 19 and 20 other embodiments of pedestal mounted controls for the throttle and transmission operating power means of my invention. The pedestal 398 of Figure 18 houses selector switches 400 and 402 of the same construction as the switch 26 disclosed in Figure 13. These switches, mounted back to back as they are, provide a compact control for the electro-pneumatic reverse gear operators of the twin engines disclosed in Figures 3 and 4.

Figure 19 is a sectional view disclosing, in detail, the pedestal mounted throttle and transmission control mechanism of Figure 2. This control includes a master selector switch 404 for controlling the transmission operating motor and a hydraulic actuator or selector 406 for, in part, operating the throttle or injector: both controls are mounted upon a pedestal 408. There is disclosed in Figure 20 control mechanism similar in function to that disclosed in Figure 19, a selector switch 410 and a hydraulic actuator 412 being mounted in a pedestal 414.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. Power means for operating the transmission of marine craft comprising a double-ended pressure differential operated motor operably connected with the transmission, a plurality of valves for controlling said motor to effect any one of an ahead, astern or neutralizing operations of said transmission, and power means for operating said valve means, said valve operating power means comprising a solenoid for operating each of said valves, a power operated switch mounted in each end of the motor for in part controlling the operation of said solenoids, a manually operated selector switch for controlling the operation of said solenoids, a neutral switch mounted on the motor and operative to make possible an operation of said solenoids to effect a neutralizing operation of the transmission, and means for actuating said switches comprising two levers, one mounted in each end of the motor and contactible by the power element of the motor, when said element reaches the end of its stroke, to rotate one or the other of the levers to break the circuits to the solenoids.

2. Power means for operating the transmission of marine craft comprising a pressure differential operated motor operably connected with the transmission, switch operating means mounted in each end of said motor and actuated by the power element thereof, valve means for controlling the operation of said motor, and power means for operating said valve means comprising a manually operable selector switch mechanism conveniently mounted to be accessible to the pilot, said switch mechanism comprising a switch for effecting a forward or an ahead operation of the transmission, another switch for effecting an astern operation, and a switch for effecting a neutralizing operation of the transmission, said power means for operating the valve means further comprising power operated cut-off switches actuated by the aforementioned switch operating means, one of said switches being mounted in each end of the motor.

CALEB S. BRAGG.